United States Patent [19]

DiGiulio et al.

[11] Patent Number: 5,331,538
[45] Date of Patent: Jul. 19, 1994

[54] MAIL PROCESSING SYSTEM CONTROLLER

[75] Inventors: Peter C. DiGiulio, Fairfield; Michael L. Ernandez, Hamden; Frank D. Ramirez, Stamford; Mark W. Van Gorp, Danbury, all of Conn.

[73] Assignee: Pitney Bowes Inc., Stamford, Conn.

[21] Appl. No.: 34,198

[22] Filed: Mar. 19, 1993

Related U.S. Application Data

[63] Continuation-in-part of Ser. No. 832,604, Feb. 12, 1992, abandoned, which is a continuation of Ser. No. 425,075, Oct. 23, 1989, abandoned.

[51] Int. Cl.$^5$ .................. G06F 15/46; G06F 15/16
[52] U.S. Cl. ...................... 364/134; 364/131; 364/138; 364/228.1; 364/DIG.1
[58] Field of Search ............... 364/131-134, 364/135, 136, 138, 140, 474.11, DIG. 1, DIG. 2

[56] References Cited

U.S. PATENT DOCUMENTS

| | | |
|---|---|---|
| 3,884,370 | 5/1975 | Bradshaw et al. . |
| 4,123,794 | 10/1978 | Matsumoto ............ 364/134 |
| 4,212,057 | 7/1980 | Devlin et al. ........... 364/134 |
| 4,410,961 | 10/1983 | Dlugos et al. . |
| 4,410,962 | 10/1983 | Daniels et al. . |
| 4,413,319 | 11/1983 | Schultz et al. ......... 364/131 |
| 4,524,426 | 6/1985 | Eckert et al. . |
| 4,525,785 | 6/1985 | Soderberg et al. . |
| 4,535,421 | 8/1985 | Duwell et al. . |
| 4,550,366 | 10/1985 | Toyama et al. ......... 364/134 |
| 4,570,217 | 2/1986 | Allen et al. . |
| 4,600,988 | 7/1986 | Tendulkar et al. ...... 364/131 |
| 4,608,661 | 8/1986 | Sasaki ................... 364/131 |
| 4,642,791 | 2/1987 | Mallozzi et al. . |
| 4,656,343 | 4/1987 | Gerritsen et al. . |
| 4,803,618 | 2/1989 | Ita et al. ................. 364/134 |
| 4,849,884 | 7/1989 | Axelrod et al. . |
| 4,849,893 | 7/1989 | Page et al. ............. 364/131 |
| 4,858,101 | 8/1989 | Stewart et al. ......... 364/131 |
| 4,942,535 | 7/1990 | Francisco ............... 364/133 |
| 4,975,833 | 12/1990 | Jinzaki .................. 364/134 |
| 5,032,975 | 7/1991 | Yamamoto et al. ...... 364/134 |
| 5,047,921 | 9/1991 | Kinter et al. .......... 364/134 |

FOREIGN PATENT DOCUMENTS

83/01520A 10/1982 World Int. Prop. O. .

*Primary Examiner*—Jerry Smith
*Assistant Examiner*—Thomas E. Brown
*Attorney, Agent, or Firm*—Charles G. Parks, Jr.; Melvin J. Scolnick

[57] ABSTRACT

The processing system controller is utilized in a mail processing system. The processing system controller provides process control over a plurality of processing subsystems which operate on a mailpiece traversing the processing system. The processing subsystems employing a plurality of prime movers controlled by the processing controller. The processing system controller includes a motor controller in bus communication with the prime movers for control of the prime movers. Sensors monitor the operating conditions and parameter of each subsystems and are in bus communication with a sensor controller. A random access memory (RAM) is in bus communication with the motor controller and the sensor controller. The motor controller and the sensor controller are programmed such that the motor controller can read from the RAM and the sensor controller can write to the RAM. The motor controller reads from the RAM at discrete time intervals and the sensor controller writes to the RAM at other discrete time intervals.

5 Claims, 2 Drawing Sheets

MAIL PROCESSING SYSTEM CONTROLLER

This application is a continuation-in-part of application Ser. No. 07/832,604 filed Feb. 12,1992, now abandoned. which is a continuation of application Ser. No. 07/425,075, filed Oct. 23, 1989, now abandoned.

BACKGROUND OF THE INVENTION

This invention relates to mail processing systems and, more particularly, to a mail processing system controller for real time system control and having the ability to interface with a plurality of peripheral devices.

Conventional mail processing system are generally custom configured to suit the particular user's need from an array of individual system of varying system performance specifications. These systems are virtually pieced together based on suitable performance specification matching and caused to operate in a generally sequential manner by the use of "Go - No Go" signals. It is also known to provide a very limited interface between the mail processing system indicia meter to a personal computer. Generally, this type of interface is non-interactive allowing for communication only from the mailing machine to the personal computer whereby limited accounting information is obtainable. Another limited interface presently known is non-interactive communication interface from a scale to the meter.

The primary obstacle to full control integration of mail processing systems, that is, placing the mail processing systems total functionality under real time microprocessor control is the relative large amount of high speed data processing capability necessary for integrated control of the system component and, further, the large amount of shared data which would be required to pass to and from the microprocessor controller in real time from the system components. A still further obstacle has been to provide such a system controller with an open architecture suitable for accommodating a variety of system configurations and. even further, which will interactively accomodate a variety of peripheral devices The afore represents severe constraint within the cost realities of such a controlled system. That is, utilizing conventional technology to endow a mail processing system with such microprocessor controlled capability has generally been considered cost prohibitive.

SUMMARY OF THE PRESENT INVENTION

It is an objective of the present invention to present a microprocessor control system particularly suited for a mail processing system which provides an open architecture and which is interactive with peripheral device in a cost effective manner to overcome all the afore noted obstacles.

The microprocessor controller is architected to provide system control over a mail/parcel processing system. The mail processing system may include such features as mixed mail feeding, sealing, weighing, postage printing, and power stacking. Parcel processing features include weighing and postage tape printing. The microprocessor controller provides control over a plurality of high-performance motors and a Meter which operate in tandem to achieve the high speed mail processing requirements.

The microprocessor controller further offers a user interface, data processing, diagnostic, and system expansion facilities. The Man-Machine user Interface (MMI) features an LCD multi-line display, keyboard, and dedicated machine & meter status displays (Hard MIMICs). The Hard MIMICs and keyboard provide the casual operator convenient access to the system's mail processing and tape functions. The LCD multi-line display plays an important role for the more sophisticated user in accessing the system's more complicated supervisor, rating, accounting, and service/diagnostic functions.

Among the microprocessor controller features are a data processing functions which includes accounting, report generation, and parcel carrier rate shopping. The microprocessor controller architecture is configured to be an open architecture allowing for the architecture to assume a plurality of configuration easily and cost effectively reconfigurable to suit operator desired option and international markets. The core configuration in the preferred embodiment includes an Existing Scale Interface (Echoplex—a secured funds communications protocol system) and two RS232 communication ports (Dual UART port). One RS232 port is available for a Weighing Platform or Rating Board. The other RS232 port is available for general use (ie. Service Port, Serial Printer, External Modem, etc.). option high-speed serial communications module (System Bus) can be added to expand the system in a modular fashion.

DETAILED DESCRIPTION OF THE PREFERRED EMBODIMENT

Figure 1:
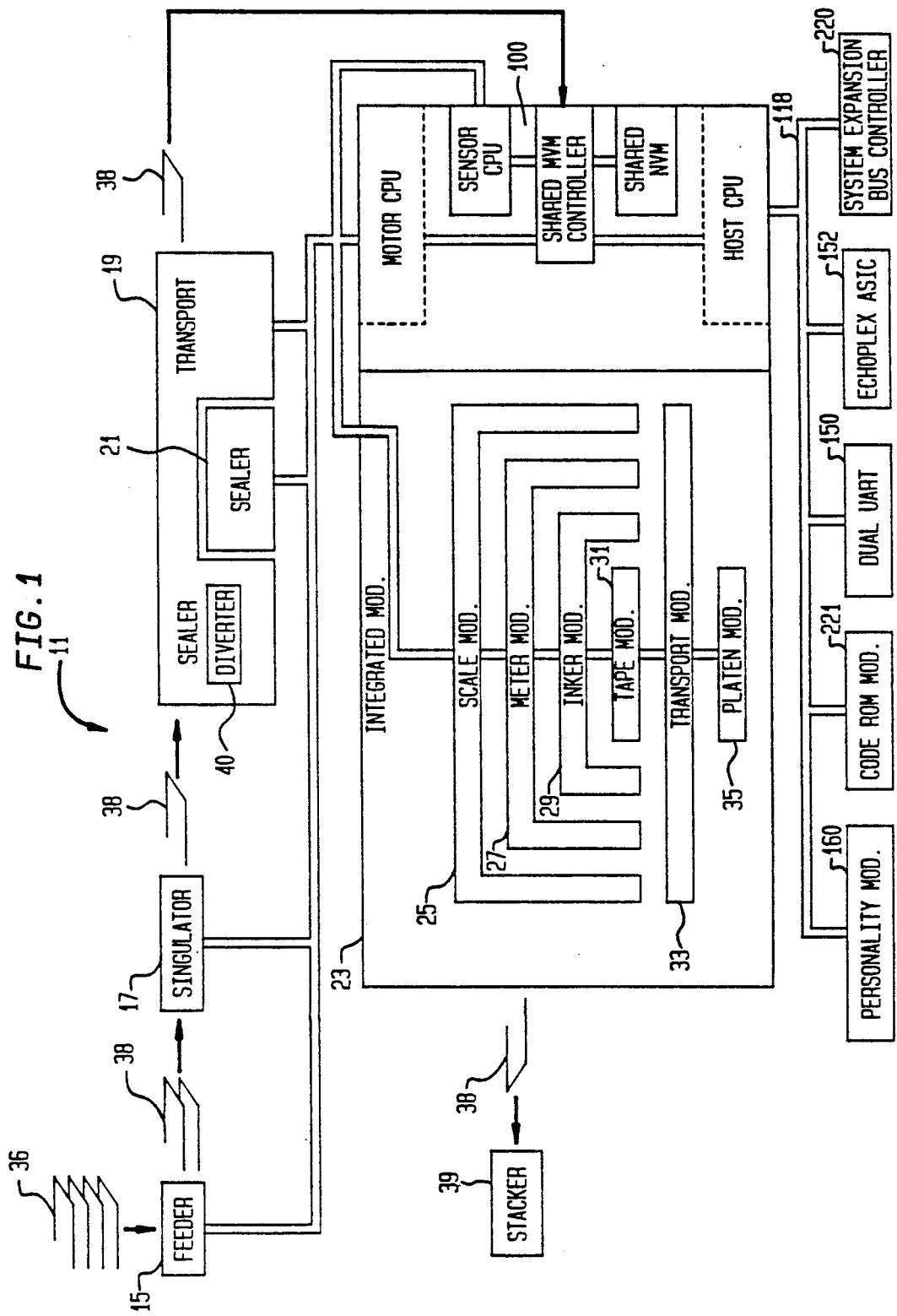
FIG. 1 is a schematic of a mail processing system in accordance with the present invention.

Referring to FIG. 1, the present invention will be here described in combination with a novel mail processing system. The present invention is equally applicable to any like system.

Referring to FIG. 1, in the most preferred environment of the present invention, the system controller, generally indicated as 100, operates on a mail processing system, generally indicated as 11, which is comprised of a plurality of modules under the control and influence of the system controller 100. The individual modules are a envelope feeder module 15, a singular module 17, a sealer transport module 19 which includes a sealer apparatus 21. Here collectively referred to as a integrated module 23, the integrated module 23 is comprised of a scale module 25, a meter module 27, a inker module 29, a tape module 31, a transport module 33 and a platen module 35. The integrated module 23 is so referred to because the individual modules are mounted in a single housing also referred to as a mailing machine 23. Each module includes the appropriate mechanism to perform prescribed mail processing functions.

Generally, the feeder module 15 receives an envelope stack 36. The feeder module 15, in the preferred embodiment, includes suitable mechanisms to shingle the bottom portion of the mail stack 36. The singulator 17 is charged with the function of extracting a bottom most envelop 38 form the now partially shingled envelop stack 36 in a seriatim manner and delivering the envelop 38 to the sealer transport module 19. The sealer transport module 19 is charged with the function of traversing the envelop 38 across the sealer module 21. The sealer module 21 is a smart module having the capability of determining the sealing state of the envelop. 38. The sealer module 19 includes a diverter module 40 for responding to the seal state of an envelope such that in an operative mode pre-sealed envelope 38 can be distinguish from unsealed envelopes 38 such that only unsealed envelopes 38 are subject to sealing by the sealer module 21. The envelope 38 is then passed to the integrated module 23 whereat the envelope is weighed and imprinted with a postage indicia. From the integrated module 23, the envelope 38 may then be passed to a power stacker 39.

Figure 2:
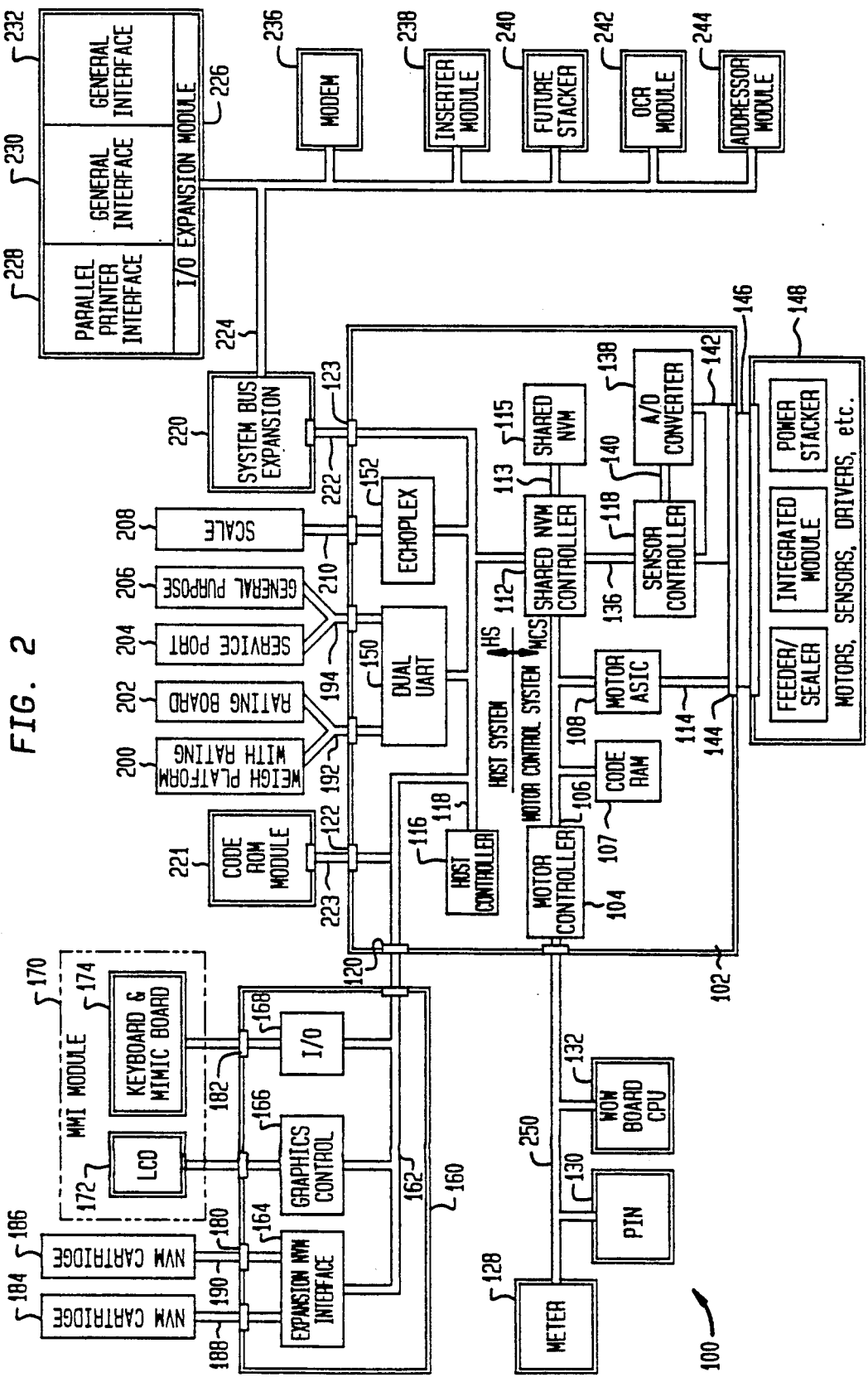
FIG. 2 is a schematic of a multiprocessor controller in accordance with the present invention.

Referring more particularly to FIG. 2, the controller system 100 is comprised of a core board 102 having located thereon a microprocessor based motor controller 104 in bus 106 communication with a code read only memory (ROM) 107, a motor application specific integrated circuit (ASIC) 108 and a shared non-volatile memory (NVM) controller 112. A microprocessor based host controller 116 is in bus 118 with the NVM controller 112 and connectors 120, 122 and 123, respectively. The controller 104 is also in bus 126 communication with a meter board 128, dater board 130 and scale board 132, also referred to as Weight On the Weight (WOW) board 132. Also in communication with the Host controller bus 118, and thereby the host controller 116, are DUAL UART input-output (I/O) module 150 and a Echoplex communication I/O module 152. The NVM controller 112 is in bus 113 communication with a shared non-volatile memory NVM 115.

A microprocessor based sensor controller 118 is in buss 136 with the NVM controller 112. An analog-to-digital (A/D) converter 138 is in buss 140 communication with the sensor controller 118. A sensor bus 142 communicates the sensor controller 118 and A/D converter to the harness coupler 144. A flex harness 146 is attached to the harness coupler 144 at one end and to the respective drive motor and sensor of the feeder 15, singulator 17, sealer-transport 19, integrated module 23 and a power stacker 39, all generally indicated in FIG. 2 as 148. It is noted that the sensor controller 118 can respond directly to digital sensor input and through the A/D converter to analog sensor input. The motor ASIC 108 is also in bus 114 communication with the harness 146 through harness coupler 116 and there with drive motor of the external modules, represented hereafter as 148.

A personality module 160 is in communication with the host controller bus 118 through a personality bus 162 through coupler 120. The personality module 160 includes a Expansion NVM 164, a graphics controller 166, and a combination keyboard and MIMC I/O port 168. A man machine interface module 170 including a liquid crystal display (LCD) board 172 and a keyboard and MIMIC board 174 which are in respective bus 176 and 178 communication with the graphics controller 166 and I/0 board 168 through respective couplers 180 and 182. NVM accounting cartridges 184 and 186 are in communication with the NVM expansion I/O board 164 through coupled bus 188 and 190, respectively.

The dual communication module 150 permits bus 192 and 194 coupling thereto of and dual combination of a weighing platform with integrated rating 200, a rating board 202, a service device 204 or such other general purpose device 206 such as a printer 206. In like manner, an echoplexed scale 208 maybe bus 210 coupled to the echoplex I/0 module 152.

A system bus controller 220 is in bus 222 communication with the host controller bus 118 through the coupler 123. Also a code ROM 221 is in coupled bus 223 communication with the host controller bus 118 through coupler 122. The system bus 224 provided communication of the system bus controller 220 with a I/O expansion module 226 from which may be coupled a parallel printer interface 228, a general purpose interface 230 and a custom parallel interface 223. Other optional devices, such as, a modem 236, an inserter module 238, an OCR module 242, an addresser module 244 and an additional stacker module 240 may be carried by bus 224.

SYSTEM OPERATION

The preferred controller 100 configuration is designed to facilitate high speed mail processing system operation and to offer substantial flexibility for system expansion. Also, it promotes easy configuration for suitability for the particulars of the international market.

The System Architecture provides a low cost solution to meet the demanding requirements of multiple high-performance DC Servo Motors while providing a flexible Man-Machine Interface (MMI), Accounting, and System Expansion Environment. To decouple the two processing environments (motor control vs. user interface/data processing), the system architecture is partitioned into a Motor Control System (MCS) and a Host System (HS). This architectural promotes system reliability by separating the host environment (HS) (with its complicated data processing requirements) from the Motor Control System (with its time critical requirements). An addition benefit is that the controller system is easily software upgradable in that all system software is housed in a plug-in replaceable ROM 221 and board replaceable ROM 107.

The Host System includes the host controller 116, ROM module 221, personality module 160, dedicated dual UART I/O module 150 and echoplex I/O 152, and System Bus Expansion Option coupler 123. The Host controller 116 executes codes found in the ROM Module 221 to provide MMI, Accounting, and System I/O functionality. The personality module 160 is used to configure the host system with respect to the MMI (ie. Small vs. Large LCD Display and the particular Keyboard Layout) and the amount of NVM available for the accounting function. The dedicated I/O's 150, 152 and 123 are described subsequently.

In the preferred embodiment, the host system will support three versions of the controller system 100, a Hi-End System, a Lo-End System, and an International Lo-End System. The Hi-End System supports the MMI Keyboard, MIMIC Status Display, a 16-line LCD Display, and two 256 KByte NVM Cartridges for accounting expansion. Significant amount of code memory is available to support system expansion. The Lo-End System supports the MMI Keyboard, MIMIC Status Display, a 2-line LCD display, and a dedicated Meter status line. Limited functionality is available with this version due to the limited memory resources available, the LCD display size, and the absence of NVM expansion for accounting. The International Lo-End Systems supports the MMI Keyboard, MIMIC Status Display, and an 8-line LCD display. Limited functionality is available with this version by virtue of the limited memory resources available, the LCD display size, and the absence of NVM expansion for accounting.

All versions of the control system 100 contain the Motor Control System which is comprised of a Motor Controller 104, Sensor Controller 118, Meter module 128, and accommodation for the WOW Module 132. The Motor Controller system is responsible for controlling the prime movers of the processing modules in accordance with the functional mode of operation. In the preferred application of the preferred embodiment, there are as many as 9 motors operating at one time. The Motor Controller system generates motion profiles for each motor and controls the motors in a servo fashion to track these profiles. All of the system sensors hang on the sensor bus 142. The sensor bus controller 118 is responsible for scanning the sensors in a pulsed manner and providing sensor status to the Motor Controller system and the Host System. The Meter 128 securely handles postal funds accounting and enables envelopes 38 and tape printing while postal funds are available. in the weigh mode, the WOW Module 130 determines the weight of an envelope 38 so that the appropriate postage can be applied to that envelope 38.

Internally, the Host system and Motor Control system communicate through a shared battery backed-up RAM 115 (also referred to as an NVM) which may contain a real-time calendar clock function. A mailbox flag communication arrangement between the Host system and Motor Control system. Essentially, the Host system is programmed to write restrict access specified to the first registers for writing information intended to be communicated to the Motor control system and read restrict access specified to the second registers to read information communicated from the motor Control system for the host system. Conversely, the Motor Control system is programmed to restrict access to the first register for reading information from the Host system and write restrict access the second registers to write information intend to be communicated to the Host system. This is done by using conventional programming techniques to limit the address fields during write and read routines. Specifically, the Host system sends a message to the Motor Control system by writing the information into a reserved region of the NVM 115 and setting a flag. Upon the detecting the flag being set, the Motor Controller system reads the message and resets the flag. The Motor Controller system sends a message to the Host system in a similar manner.

The co-processor of the Motor Controller 106 and the Sensor Controller 118 also shares the NVM 115. However, whereas the Host system and Motor Controller system communicate in a mailbox and flag manner, the Sensor Controller 118 continually updates the shared NVM 115 with sensor status information. This sensor information is directly readable by both the Host system and Motor Controller system. The Sensor Controller 118 scans different sets of sensors depending on the system mode of operation (ie. Tape or Mail Processing). To determine which scan mode to use, the Sensor Controller reads control information written into the Shared NVM by the Motor Controller 104.

It should be appreciated that the host controller 116 is conventionally programmed to transfer process parameters over the data bus. The shared NVM 115 includes other addressable registers floor storing the machine parameters forwarded by the host controller 116. The shared memory controller 112 is further programmed to provide the host system controller 116 access to data bus for accessing the other registers of the shared NVM 115 during a certain time interval. It should be appreciated that the shared NVM controller 112 is conventional in that the shared NVM controller 112 only permits bus access to the shared NVM 115 by one controller 104, 116 or 118 at a time.

The electronics hardware common to all system configurations are contained in the Core Board 102. Electronics hardware which vary depending on system configuration are contained on separate boards. These include the Personality Module 160, Code ROM Module 221, the MMP System Bus Controller 202, and the WOW Module 132. The first three modules connect directly to the Core Board 102 (electrically, they attach to the Host Bus 118). The WOW Option Module connects to the Meter Bus 250.

In addition to the Motor Control System with the Shared NVM and Calendar Clock, the Core Board contains the MMP Host Processor, a Dual RS232 UART Interface, and an existing Scale interface. These electronics have been combined onto the Core MMP Board to provide a more integrated shared memory environment. The inclusion of both the Host controller and Motor Controller 104 onto a single control board 102 facilitates future use of a single controller to derive a higher level integration for cost reduction whereby a future motor control processor operating with a more highly integrated ASIC would be powerful enough to handle the functions of both the existing Motor Controller and Host processors.

The ROM Module 221 contains the executable code for both the controller 116 Host and the Motor Controller 104. On power-up, Motor Controller 104 Power-Up Diagnostics are downloaded from the ROM Module 221 to Motor Controller RAM 107 and executed from that RAM. After these diagnostics complete successfully, the Motor Controller's normal run-time code is downloaded to the code RAM 107 and executed.

This greatly simplifies making software upgrades to the system. A single inexpensive replaceable Module contains all of the software code with the exception of the Sensor Bus Controller. The Sensor Bus Controller software which is not expected to change after launch is masked into internal ROM of the sensor controller 118.

The Motor Controller 116 provides the overall system timing for the various system operating modes and generates the control signals for the system motors, solenoids, etc. The operating mode of the Motor Controller 104 is established by control information provided by the Host System. The Motor Controller 104 then acts on Sensor Controller machine state information, Motor Encoder shaft position data, WOW Option weight data, when present, and Meter timing & accounting data to provide the required processing functions.

In the WOW mode, the Motor Controller determines the postage rate for each envelope in real-time using a postage rate versus WOW weight table which is sent to it from the Expansion System at startup.

The sensor controller 118 monitors the state of mailflow processing and furnishes this information to the Motor Controller 104 and the Host controller via the shared NVM. Its real-time functions include envelope position tracking for motor control and jam detection, envelope thickness sensing, envelope flap profile tracking for the sealing function, and sensing the state of system mechanics for motor control. Background activities include sensing the Sealer Water Level, the Printer Ink Level, and the System Interlocks.

The Personality Module 160 provides the Man-Machine Interface (MMI) Module 170 as well as an interface for Accounting Non-Volatile Memory (NVM) Expansion 184 and 186. The MMI Module 170 is comprised of a Keyboard and Status Mimic Board 174 as well as an LCD display module 172. Various versions of the system may be configured. The difference between them is found in the type of LCD display and the amount of Accounting Expansion NVM provided.

The System Bus Expansion Module 220 is a communications option which connects to the Core MMP Board to allow other internal and external option modules to be added to the system. It employs a high-speed multidrop serial communications link to support up to modules which connect to the bus.

Internal Option Modules include the I/O Expansion Module, a Modem Interface, and an MMS interface. The I/O Expansion Module provides ports to allow the MMP to interface to a Centronics Printer, future scales, future Enhancements, and a remote computer. The Modem Interface is used to perform a centralized accounting and remotely diagnose the system and add funds to the Meter. The MMS module would provide a dedicated interface to a centralized accounting system.

External Option Modules under consideration will connect to the Expansion System via the System Bus. These are an Inserter Module, an OCR Module, an Addresser Module, and a Sorting Stacker. The MMP's System Bus will allow these modules to be greater than 30 feet from the MMP System.

What is claimed is:

1. A controller system for providing process control by controlling the operation of a plurality of machine modules to carry out a plurality of programmed processes, each of said machine modules having a plurality of subsystems for executing respective process functions, said controller system comprising:

a first system controller means for controlling a first machine module subsystems common to respective ones of said plurality machine modules in accordance with programming for said respective machine modules in response to a plurality of selectable machine parameters and process parameters;

a second system controller means for controlling a second machine module subsystem common to respective ones of said plurality of machine modules in accordance with programming for said respective machine modules in response to a plurality of selectable machine parameter and process parameters;

a data bus, said first and second system controller having microprocessor means for transmitting process parameters on said data bus and accessing process parameters along said data bus;

shared memory means having a memory unit, said memory unit having plurality of first addressable registers for storing said process parameters, and having a shared memory controller means for providing said first system controller access over said data bus for access to said first addressable registers bysaid memory unit during a first time interval and for providing said second controller access over said data bus for access to said first addressable registers of said memory during a second time interval said first controller microprocessor means being programmed to restrict said first controller microprocessor read only data from said first registers of said memory unit, and said second controller microprocessor means being programmed to restrict said second controller microprocesor to write only data to said first registers of said memory unit;

a host controller having microprocessor means for transmitting processor parameters over said data bus;

said memory unit having a plurality of second addressable registers for storing said machine parameters;

said shared memory controller means for further providing said host system controller access to said data bus for access to said first addressable registers of said memory unit during a third time interval;

said host controller microprocessor being programmed to access said first ones of said addressable registers of said memory at a third time interval by said shared memory means;

said first and second controllers being further programmed to read from and write to said second ones of said registers of said memory unit.

2. A processing system controller for controlling the operation of a plurality of machine modules to carry out a plurality of programmed processes, each of said machine modules having a plurality of subsystem for executing respective process functions, said controlled system comprising:

a motor controller means for actuating respective prime movers of said respective machine modules in response to said machine parameters and for controlling the respective prime movers of said respective machine modules in accordance with programming for said respective machine modules in response to a plurality of selectable machine parameters and process parameters;

sensing means for selectively and continuously sensing said respective machine module status and generating state signals in response thereto;

a sensor controller means for receiving said state signals and generating process parameter and for actuating said sensing means in accordance with select ones of said machine parameters;

a host system controller means for controlling ancillary process functions;

a data bus, said motor, sensor and host system controllers having microprocessor means for transmitting process parameters on said data bus and accessing process parameters along said data bus;

shared memory controller means for providing said motor controller an sensor controller access to read from and write to select ones of said registers by said shared memory means at said respective first and second time intervals;

shared memory means having a memory unit, said memory unit having a plurality of first and second addressable registers for storing said parameters wherein said shared memory controller means is programmed to provide said motor controller access to said data bus for access to said addressable registers of said memory unit during a first time interval, for providing said sensor controller access to said data bus for access to said addressable registers during a second time interval (c) for providing said host controller access to said data bus for access to a said addressable registers or said memory unit during a third time interval; and, said motor controller microprocessor means being programmed to restrict said motor controller microprocessor to read data from only said first registers of said memory unit, and to read data from and write data to said second registers of said memory unit;

said senor controller microprocessor means being programmed to restrict said second controller microprocessor to write data only to said first registers of said memory unit, and to read data from and write data to said second registers of said memory unit.

3. A processing system controller as claimed in claim 2 wherein said motor controller sets a respective flag after reading any of said registers and sensor controller to reset said flags set by said motor controller, said motor controller only to read these registers where said flag is reset.

4. A processing system controller as claimed in claim 3 wherein said sensor controller being further programmed to write to those one said registers where the register value has been changed in response to a changed state of said sensor means.

5. A process system as claim in claim 2 wherein said process system controls the operation of a combination postage meter mailing machine and envelop feeder, and further comprising:

a motor interface in bus communication with a plurality of motor driver means for driving respective motors in accordance with said programming of said motor controller of said respective postage meter mailing machine and envelope feeder;

said senor controller being in bus communication with a plurality of senor means for sensing a plurality of system parameters in accordance with said programming of said sensor controller of said said respective postage meter mailing machine and envelope feeder.

* * * * *